Aug. 23, 1932.  C. H. WHITE  1,873,518
DISK HARROW
Filed Nov. 19, 1931   2 Sheets-Sheet 1
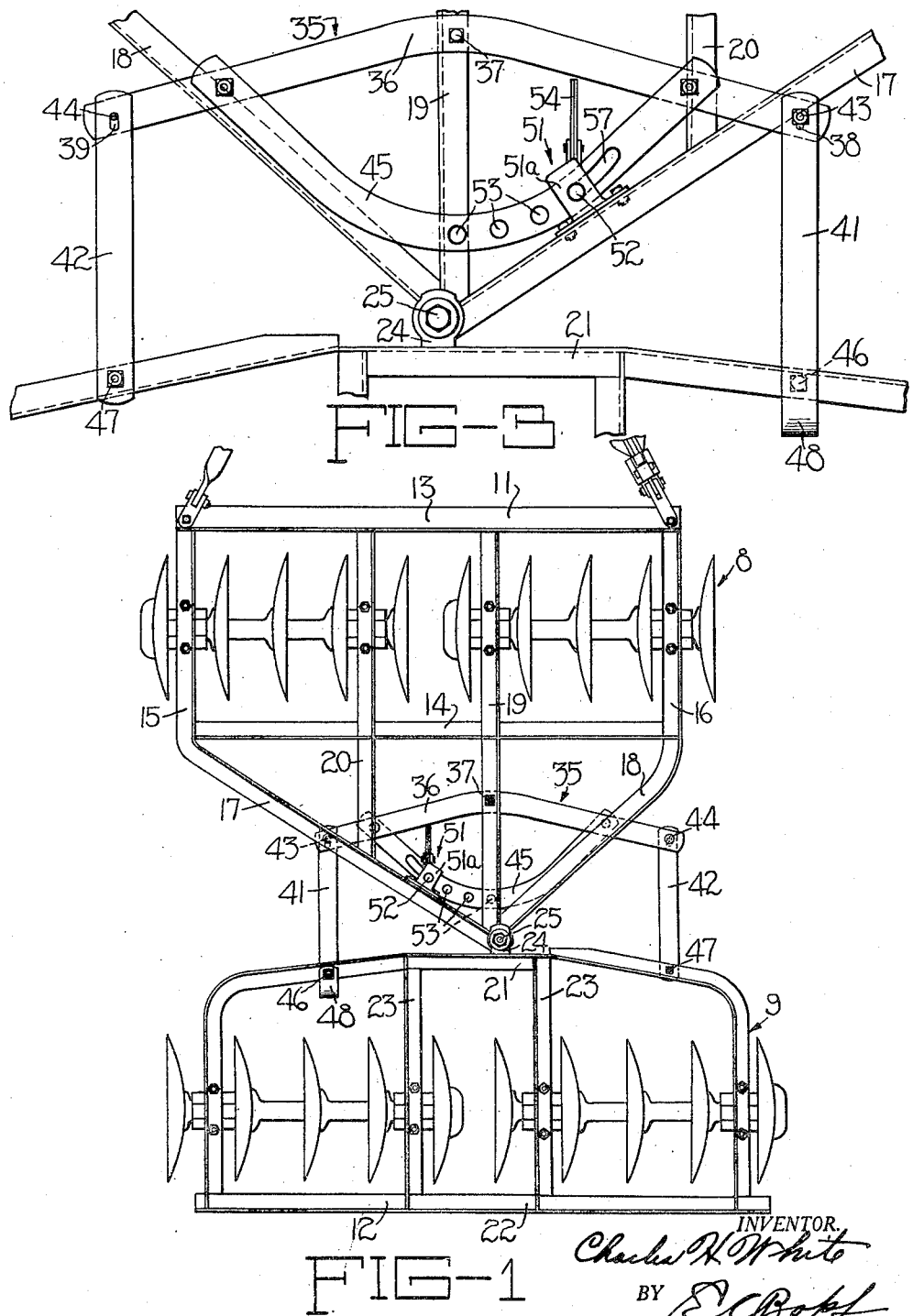
WITNESS.
Edward Melin.
INVENTOR.
Charles H. White
BY
ATTORNEY.

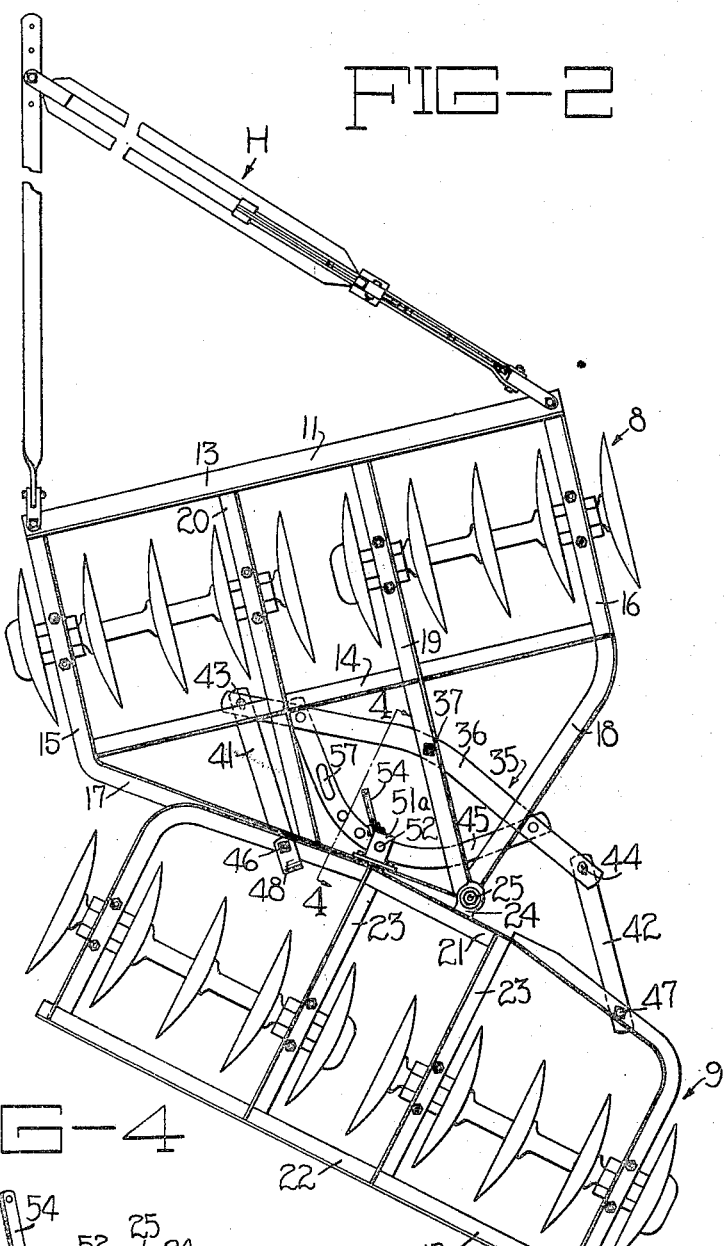

Patented Aug. 23, 1932

1,873,518

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

DISK HARROW

Application filed November 19, 1931. Serial No. 576,010.

My invention relates to disk harrows and particularly to the two gang tandem off-set type. This type of harrow is particularly adapted for cultivating in orchards because of its natural tendency to operate in a lateral off-set position with respect to the tractor.

One of the objects of the invention is to provide an improved angle adjusting mechanism for holding the two gangs in selected angular positions of adjustment, which comprises a swinging member or beam pivoted on one of the gangs, and connected with the other gang by means of one or more links. Preferably I employ a pair of parallel links for connecting the beam with one gang, the link connection being such that the draft stress in each link is always in tension, irrespective of the angle of the gangs or by the distribution of the load on the rear gang, and irrespective of whether a pulling force or a backward thrust is applied to the harrow. An advantage of this arrangement is that a much lighter material may be used for the parallel links than if they needed to withstand compression stresses.

Another object of the invention is to provide an angle adjusting mechanism which permits the gangs to freely turn into a reverse angle from a transport position, to facilitate the making of a right hand turn, and this without placing the parallel links in compression.

Other objects and advantages of my invention will be apparent to those skilled in the art after a consideration of the following detailed description taken in conjunction with the accompanying drawings wherein:

Figure 1 is a plan view of a conventional tandem off-set disk harrow illustrating my improved angle adjusting mechanism with gangs shown in position for transporting;

Figure 2 is a plan view of the disk harrow showing the gangs angled to an operation position;

Figure 3 is an enlarged inverted detail view of the angle adjusting mechanism and the associated frame members of the front and rear gangs; and, Figure 4 is an enlarged detail view taken on the plane of line 4—4 of Figure 2.

The disk harrow comprises the usual front gang 8 and rear gang 9 having disk supporting frames 11 and 12, respectively. The frame 11 of the front gang comprises a pair of transversely disposed parallel angle iron bars 13 and 14. Angle iron bars 15 and 16 are secured to the ends of the transverse bars 13 and 14 and serve to hold these bars in spaced parallel relation. The rear ends of the bars 15 and 16 converge rearwardly at 17 and 18 and are secured to a vertical sleeve or pivot member (not shown). An angle iron bar 19 extends forwardly from the pivot member and is secured to the bars 13 and 14. An angle iron bar 20 is positioned parallel to bar 19 and is also secured to the bars 13 and 14 and to the converging bar 17. A pair of disk gang units are disposed in axial alignment between the transverse bars 13 and 14 and are supported at their adjacent inner ends by the angle iron bars 19 and 20, and at their outer ends by bars 15 and 16.

A tractor hitch H is attached to the front transverse bar 13 and is adapted to be coupled to the drawbar of a tractor.

The frame 12 of the rear gang 9 comprises a rearwardly extending U-shaped angle iron member 21 and a transversely positioned angle iron bar 22 is secured to the ends thereof. Spaced parallel angle iron bars 23 extend between the members 21 and 22 and support the inner ends of the axially aligned rear disk gangs the outer ends thereof being supported on the U-shaped member 21. A pivot bracket 24 having a pair of vertically spaced perforated arms is secured to the member 21 and extends forwardly therefrom. A pivot bolt 25 passing through the perforations in the arms of bracket 24, and through the sleeve which is located at the converged ends of the bars 17 and 18, connects the front and rear gangs.

The front and rear gangs are held in any one of a number of angular operating positions by means of an angle adjusting mechanism indicated in its entirety by numeral 35. The angle adjusting mechanism 35 comprises a walking beam 36 pivotally mounted at 37 on the bar 19. The ends of the beam 36 extend laterally from the pivot 37 and are bent slightly rearward therefrom. An arcuate bar 45 is formed integral with or otherwise secured to the walking beam 36 and is disposed concentric to the pivot 37. The ends of beam 36 are connected with the rear gang through a pair of links 41 and 42 positioned substantially parallel to each other and to the line connecting bolts 25 and 37. Slots 38 and 39 are provided in the forward ends of parallel link members 41 and 42, respectively, and pivotally engage bolts 43 and 44 provided in the respective ends of the walking beam 36. Links 41 and 42 extend rearwardly and are pivotally connected to member 21 of frame 12 by pivot bolts 46 and 47. The end of link 41 is looped at 48 so as to contact with the upper face of the angle iron bar 21 to permit the bar 21 to slide over the bar 17 when the disk gangs are adjusted to their extreme angled position. The distance between the center of the bolt hole for bolt 46 and the center of curvature of the rear end of slot 38 on link 41, that is, the effective length of this link, is equal to the distance between the corresponding points on link 41, the effective length of this link which is made equal to the distance between the centers of bolts 37 and 25.

A latch 51 is provided for locking the beam 36 in adjusted positions. This latch comprises a bracket 51a secured to the angle iron frame bar 17 and an opening is provided therein to permit bar 45 to slide therethrough. A locking pin 52 is supported in bracket 51 and is adapted to selectively engage holes 53 provided in arcuate bar 45. A lever 54 is pivotally mounted on bracket 51 and one end of the lever engages the locking pin 52. A rope or cable may be secured to the opposite end of lever 54 and extend forwardly to the operator's seat on the tractor. A spring 55 embraces pin 52 and is interposed between lever 54 and a plate 56 which is formed on bracket 51 and serves to normally hold the pin 52 in engagement with one of the holes 53. A slot 57 is provided in the arcuate bar 45 and the pin 52 extends into this slot when the disk gangs are straightened for transport. The holes 53 and the slot 57 are disposed on an arc concentric with the pivot 37.

When the disk harrow is being transported the gangs 8 and 9 are straightened, as shown in Fig. 1, so that the disks run in a longitudinally straight line and the pin 52 is positioned in the slot 57. To angle the disk gangs into an operating or cutting position the operator pulls on the lever 54, thereby lifting the pin 52 out of the slot 57. The tractor is then backed, forcing the disk gangs to angle, until the pin 52 registers with a selected one of the holes 53 whereupon the lever 54 is released so as to permit the pin to drop into the hole. In Fig. 2 the disk gangs are shown in the extreme angled position with the pin 52 engaging the last hole 53.

Under normal operating conditions when pulling straight ahead, draft is transmitted to the rear gang through pivot bolt 25, working beam 36 and parallel links 41 and 42. In the operating positions the bolt 43 normally engages the front end of the slot 38 and the stress in the link 41 is therefore in tension. The strain in the link 41 and in the members comprising the frame cause the bolt 44 to move away from the end of the slot 39 whereby the link 42 is under no stress. In following the uneven contour of the ground the frame of the rear gang may rotate slightly in the opposite direction causing the bolt 44 to engage the end of the slot 39 and moving the bolt 43 away from the end of the slot 38. The stress in the link 42 is then in tension and the link 41 is under no stress.

The slots 38 and 39 in the links 41 and 42 prevent a compression stress in either of the links. When the link 41 is under tension the link 42 is under no stress and vice versa when the link 42 is under tension the link 41 is not stressed. By reason of the effective length of the links 41 and 42 being equal, and equal to the distance of pivot 37 from the pivot 25, and being substantially parallel to the link connecting these pivots, the relationship between the links and the beam 36 remains substantially the same in all angular positions of the gangs. This assures the presence of only tension stress in either link irrespective of in what angular position of adjustment the gangs are placed.

In transporting, the gangs are held in a parallel position by pin 52 contacting with the rear end of the slot 57, the natural tendency of the rear gang being to swing in a clockwise direction when traveling straight forward or when turning to the left. When turning to the right, the pin 52 moves forward in the slot 57 and enables the gangs to go into a reverse angle which facilitates the making of a turn in this direction.

It will be readily apparent from the foregoing that a compression stress is not present in the links 41 and 42 whether the disk harrow is in transport or operating position, or whether it is drawn forwardly or backed. By reason of the absence of a compression stress in the links 41 and 42 at all times, these members may be made of lighter material than if these members needed to also withstand compression stresses.

While I have described in connection with the accompanying drawings the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:—

1. A tandem offset disk harrow comprising a front gang and a rear gang pivotally connected for relative angular movement, an angle adjusting mechanism pivotally supported on the front gang, said mechanism including a latch for locking the same to the front gang, and a pair of parallel links connecting the adjusting mechanism and the rear gang in such a manner that any tendency for relative rotation of the gangs in one direction is resisted by one of the links acting in tension, and any tendency for relative rotation of the gangs in the other direction is resisted by the other link acting in tension.

2. A tandem offset disk harrow comprising a front gang and a rear gang pivotally connected for relative angular movement, an angle adjusting mechanism for locking the gangs in different angled positions, said mechanism including a beam pivotally supported on one gang, a pair of parallel links pivotally connected to the other gang, and means connecting said beam with said links in such a manner that any tendency for relative rotation of the gangs in one direction is resisted by one of the links acting in tension, and any tendency for relative rotation of the gangs in the other direction is resisted by the other link acting in tension.

3. A tandem offset disk harrow comprising a front gang and a rear gang pivotally connected for relative angular movement, an angle adjusting mechanism for locking the gangs in different angled positions, said mechanism including a beam pivotally supported on one gang, a pair of parallel links pivotally connected to the other gang, and a connection capable of stressing the link only in tension connecting each link with said beam.

4. A tandem offset disk harrow comprising a front gang and a rear gang pivotally connected for relative angular movement, an angle adjusting mechanism for locking the gangs in different angled positions, said mechanism including a beam pivotally supported on one gang, a pair of parallel links pivotally connected to the other gang at points spaced on opposite sides of the point of pivotal connection of the gangs, and a connection capable of stressing the link only in tension connecting the links with opposite ends of said beam.

5. A tandem offset disk harrow comprising a front gang and a rear gang pivotally connected for relative angular movement, an angle adjusting mechanism for locking the gangs in different angled positons, said mechanism including a beam pivotally supported on one gang, a pair of parallel links pivotally connected at one end to the other gang and to opposite ends of said beam, the connection at one end of each link being capable of transmitting stress to the link only when the end of the beam with which the link is associated is stressed in a particular direction.

6. In a disk harrow, the combination of a front gang, a rear gang, said gangs being pivotally connected together to permit relative angular adjustment thereof, and an angle adjusting mechanism between the gangs comprising a walking beam pivotally supported on one gang, parallel links connecting said beam with the other gang, an arcuate bar secured to the walking beam to position the effective portion thereof concentric with the point of pivotal connection of the beam with one gang, and a latch device mounted on said one gang and adapted to engage the arcuate bar to lock the gangs in angled position.

7. A disk harrow comprising a front gang, a rear gang, a single pivot connecting said gangs, and angle adjusting mechanism for locking said gangs in different angled positions, said mechanism comprising a beam, a second pivot connecting said beam intermediate its ends to one of said gangs, and a pair of parallel links of a length equal to the distance between said pivots connecting opposite ends of said beam to the other gang.

8. A disk harrow comprising a front gang, a rear gang, a single pivot connecting said gangs, and angle adjusting mechanism for locking said gangs in different angled positions, said mechanism comprising a beam, a second pivot connecting said beam intermediate its ends to one of said gangs, and a pair of parallel links connected between opposite ends of said beam and points spaced on opposite sides of said first pivot, said links being equal in length to the distance between said pivots and disposed in parallel relationship to a line connecting said pivots.

9. In a tandem offset disk harrow, the combination of a front gang, a rear gang, said gangs being pivotally connected to permit relative angular adjustment thereof, and an angle adjusting mechanism comprising a transversely disposed walking beam pivoted intermediate its ends to the front gang, said pivot being in substantial longitudinal alignment with the pivot of the gangs when the gangs are adjusted for transport, a pair of parallel links having slots in their forward ends, a pivot bolt provided at each end of the walking beam and adapted to engage in the slots in links, respectively, pivotal connections on the rear gang for the rear ends of said links, an arcuate bar secured to the walking beam, a plurality of holes in the arcuate bar positioned concentric with the pivot of the beam with the front gang, a latch supported on the front gang and adapted to selectively engage the holes in the arcuate bar to lock the gangs in angled positions, and a slot in the arcuate bar adapted to engage with the latch when the gangs are adjusted for transport.

10. A disk harrow comprising two pivotally connected angularly adjustable disk gangs, an angle adjusting mechanism supported on one gang for movement relative thereto about a pivot on said gang located in substantial longitudinal alignment with the pivot of the gangs, means for locking said mechanism against such movements, said mechanism including a pair of parallel links connecting the adjusting mechanism and the rear gang, the connection at one end of said links being such that any tendency for relative rotation of the gangs in one direction is resisted by one of the links acting in tension, and any tendency for relative rotation of the gangs in the other direction is resisted by the other link acting in tension.

11. A disk harrow comprising two pivotally connected angularly adjustable disk gangs, an angle adjusting mechanism supported for movement relative to one gang, means for releasably locking said member against movement relative to said gang, and means connecting said mechanism to the other gang including a pair of parallel links pivoted on said gang, each link having a slot adapted to receive a bolt in the adjusting mechanism, relative rotation of said gangs in one direction being resisted by the bolt of one connection bearing against the end of its slot, and relative rotation of said gangs in the other direction being resisted by the bolt of the other connection bearing against the end of its slot.

12. A disk harrow comprising a front gang, a rear gang, a single pivot connecting said gangs, and angle adjusting mechanism for locking said gangs in different angled positions, said mechanism comprising a swinging member, a second pivot connecting said member to one of said gangs, and means connecting said swinging member with the other gang including a link of a length equal to the distance between said pivots pivoted to the swinging member and to the other gang.

13. A disk harrow comprising a front gang, a rear gang, said gangs being pivotally connected together to permit relative angular adjustment thereof, and an angle adjusting mechanism between the gangs comprising a swinging member pivotally supported on one gang, and means connecting said swinging member with the other gang including a link, and a latch device mounted on said one gang and adapted to engage the swinging member to lock the gangs in angled position.

CHARLES H. WHITE.